United States Patent Office 3,707,487
Patented Dec. 26, 1972

3,707,487
6-CYANO-4,6-PREGNADIENES, METHODS FOR THEIR MANUFACTURE, AND INTERMEDIATES THEREOF
Thomas L. Popper, Verona, Hershel L. Herzog, Glen Ridge, and Elliot L. Shapiro, Cedar Grove, N.J., assignors to Schering Corporation, Bloomfield, N.J.
No Drawing. Filed Jan. 28, 1971, Ser. No. 110,742
Int. Cl. C07c 169/34
U.S. Cl. 260—397.4                     8 Claims

ABSTRACT OF THE DISCLOSURE 6-cyano-4,6-pregnadiene-3,20-diones having progestational activity are prepared from 6-oximinomethyl-4,6-pregnadiene-3,20-diones by treatment thereof with a dehydrating agent selected from the group consisting of phosphorus oxychloride, a lower alkanoic acid anhydride in pyridine, and a lower alkanoic acid anhydride in the presence of sodium acetate. Preferred compounds are 6-cyano-16-methylene-17α-lower alkanoyloxy-4,6 - pregnadiene-3,20-diones.

FIELD OF INVENTION

This invention relates to novel compositions-of-matter, to methods for their manufacture, and to novel intermediates thereof.

More specifically, this invention relates to 21-unsubstituted-6-cyano-4,6-pregnadiene-3,20 - diones having progestational activity, to methods for their manufacture and to novel 21-unsubstituted-6-oximinomethyl-4,6-pregnadiene-3,20-dione intermediates useful therein.

DESCRIPTION OF PRIOR ART

Known in the art are 3-enol ethers of 6-oximinomethyl-progesterones (i.e., 3-lower alkoxy-6-oximinomethyl-3,5-pregnadien-20-ones) and the process of treating a 3-enol ether of a 6-oximinomethylprogesterone with a lower alkanoic acid anhydride, preferably in the presence of an alkali metal acetate, to form a 3-enol ether of a 6-cyano-progesterone (i.e., a 3-lower alkoxy-6-cyano-3,5-pregnadien-20-one).

Also known in the art are 3-enol esters of 6-cyano-progesterones (i.e., 3-lower alkanoxyloxy-6-cyano - 3,5-pregnadien-20-ones) which when subjected to mild alkaline hydrolysis are converted to an inseparable mixture of a 6-cyanoprogesterone and its enol form, with the enol form predominating (i.e., a mixture of a 6-cyano-4-pregnene-3,20-dione and the corresponding enol, 6-cyano-3,5-pregnadien-3-ol-20-one). Accordingly, unknown in the art is a 6-cyanoprogesterone free from its enol form.

By our invention, we have discovered that by treating an enol ether of a 6-oximinomethylprogesterone with 2,3-dichloro-5,6-dicyano-1,4-benzoquinone (hereinafter referred to as DDQ) there is obtained a novel compound, i.e., a 6-oximinomethyl-6-dehydroprogesterone, which, upon treatment with a dehydrating agent selected from the group consisting of phosphorus oxychloride, a lower alkanoic acid anhydride in pyridine, and a lower alkanoic acid anhydride in the presence of sodium acetate, will produce novel compounds having progestational activity, i.e., 6-cyano-6-dehydroprogesterones (also named 6-cyano-4,6-pregnadiene-3,20-diones) wherein the carbonyl group at C–3 exists only in the ketonic form.

SUMMARY OF INVENTION

This invention to chemical compounds having progestational activity which have a molecular structure comprising a 4,6-pregnadiene-3,20-dione nucleus with a cyano group at C–6 and preferably also having a methylene group at C–16 and an alpha lower alkanoyloxy group at C–17. Also included are 16-methyl derivatives and compounds unsubstituted at both C–16 and C–17.

The invention sought to be patented in a composition-of-matter aspect resides in the concept of a chemical compound useful as an intermediate which has a molecular structure comprising a 4,6-pregnadiene-3,20-dione nucleus with a 6-oximinomethyl group at C–6 and which may also be substituted at C–17 by an alpha lower alkanoyloxy group and at C–16 by groups such as methylene or methyl.

The invention sought to be patented in the process aspect of this invention resides in the concept of treating a 6-oximinomethyl-4,6-pregnadiene-3,20-dione with a dehydrating agent selected from the group consisting of phosphorus oxychloride, a lower alkanoic acid anhydride in pyridine, and a lower alkanoic acid anhydride in the presence of sodium acetate, whereby is produced a 6-cyano-4,6-pregnadiene-3,20-dione having progestational activity.

GENERAL DESCRIPTION OF THE INVENTION

Composition-of-matter aspect

Included among the physical embodiments of progestationally active compositions-of-matter of this invention are 6-cyano-4,6-pregnadienes having the following structural Formula I:

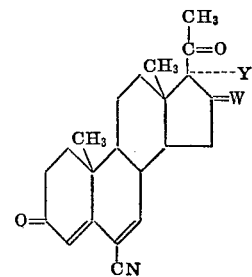

(I)

wherein W is a member selected from the group consisting of hydrogen, methylene, (H,α-methyl) and (H,β-methyl); and Y is a member selected from the group consisting of lower alkanoyloxy, and hydrogen when W is hydrogen or (H,methyl).

The lower alkanoyloxy groups are preferably derived from lower alkanoic acids having up to 8 carbon atoms including acetic, propionic, n-butyric, iso-butyric, trimethylacetic, valeric, iso-valeric, caproic, and capyrylic acids.

Preferred compuonds of this invention are those wherein W is methylene and Y is lower alkanoyloxy, preferably acetoxy. Included among the 17α-lower alkanoyloxy compounds of this invention are:

6-cyano-17α-acetoxy-4,6-pregnadiene-3,20-dione and the 16α-methyl- and 16β-methyl homologs thereof,
6-cyano-16-methylene-17α-acetoxy-4,6-pregnadiene-3,20-dione (a preferred compound of this invention), 6-cyano-16-methylene-17α-propionyloxy-4,6-pregnadiene-3,20-dione,
6-cyano-16-methylene-17α-valeryloxy-4,6-pregnadiene-3,20-dione, and
6-cyano-16-methylene-17α-caproyloxy-4,6-pregnadiene-3,20-dione.

The compounds of Formula I of this invention also include compounds unsubstituted at C–17 such as 6-cyano-4,6-pregnadiene-3,20-dione (i.e. 6-cyano-6-dehydro progesterone),
6-cyano-16α-methyl-4,6-pregnadiene-3,20-dione, and
6-cyano-16β-methyl-4,6-pregnadiene-3,20-dione.

The physical embodiment of the 6-cyano-6-dehydroprogesterones of Formula I are characterized by being crystalline solids, usually off-white to white in color, which are insoluble in water and soluble in most organic solvents, although of limited solubility in dialkyl ethers and aliphatic hydrocarbons.

The 6-cyano-6-dehydroprogesterones defined by Formula I prossess progestational activity as demonstrated by studies in immature rats by the well known Clauberg method via the intra-muscular route. The compounds may be used as medicaments in conditions requiring a progestational agent, e.g. in fertility control and in the management of various menstrual disorders. They may be administered via the intramuscular route in a manner similar to that in which known progestational agents, e.g., progesterone, are administered, the dosage depending on the age and size of patient and in the nature and severity of the ailment being treated. The preferred 6-cyano-16-methylene-17α-lower alkanoyloxy-4,6-pregnadiene - 3,20-diones possess enhanced progestational activity over that of the prior art enol-ether derivative of the corresponding 6,7-dihydro analog. Thus, for example, 6-cyano-16-methylene-17α-acetoxy-4,6-pregnadiene-3,20-dione (preferred compound of Formula I) exhibits about three times more progestational activity than the prior art 3-ethoxy-6-cyano-16-methylene-17α-acetoxy - 3,5 - pregnadiene-3,20-dione (i.e., the 3-enol ethyl ether of 6-cyano-16-methylene-17α-acetoxyprogesterone) when tested in immature rats via the intramuscular route by the Clauberg method.

The physical embodiments of the compounds of this invention which are useful as intermediates include 6-oximino-methyl-6-dehydroprogesterones of following structural Formula II:

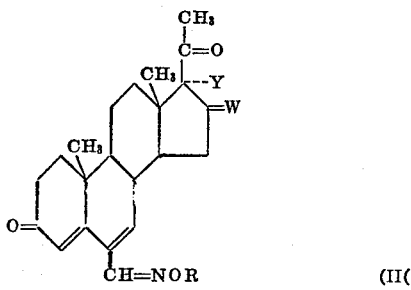

wherein R is a member selected from the group consisting of hydrogen and lower alkanoyl; W is a member selected from the group consisting of hydrogen, methylene, (H,α-methyl) and (H,β-methyl); and Y is a member selected from the group consisting of lower alkanoyloxy, and hydrogen when W is hydrogen or (H,methyl).

The compounds defined by Formula II are useful as intermediates in the process aspect of our invention as described in detail hereinbelow; the preferred compounds being 6-oximino-methyl-16-methylene-17α-lower alkanoyloxy (particularly 17α-acetoxy)-4,6-pregnadiene-3,20-diones since they are intermediates in preparing the preferred, progestationally active 6-cyano-16-methylene-17α-lower alkanoyloxy-4,6-pregnadiene-3,20-diones of Formula I.

Illustrative of compounds of Formula II are 17-unsubstituted compounds such as:

6-oximinomethyl-4,6-pregnadiene-3,20-dione and the 16α-methyl and 16β-mehyl homologs thereof,
6-acetoximinoethyl-4,6-pregnadiene-3,20-dione and the 16α-methyl and 16β-methyl homologs thereof, and
17α-lower alkanoyloxy derivatives such as:
6-oximinomethyl-17α-acetoxy-4,6-pregnadiene-3,20-dione and the 16α-methyl and 16β-methyl homologs thereof,
6-oximinomethyl-16-methylene-17α-acetoxy-4,6-pregnadiene-3,20-dione,
6-acetoximinomethyl-16-methylene-17α-acetoxy-4,6-pregnadiene-3,20-dione,
6-oximinomethyl-16-methylene-17α-propionyloxy-4,6-pregnadiene-3,20-dione,
6-oximinomethyl-16-methylene-17α-valeryloxy-4,6-pregnadiene-3,20-dione, and
6-oximinomethyl-16-methylene-17α-caproyloxy-4,6-pregnadiene-3,20-dione.

The physical embodiments of the compounds defined by Formula II are characterized by being crystalline solids, usually white to off-white in color, and soluble in chlorinated hydrocarbons, acetone, and lower alkyl alcohols, e.g. methanol.

The 6-oximinomethyl-4,6-pregnadiene-3,20-dione of Formula II are conveniently derived from the known enol ether derivatives of the corresponding 6,7-dihydro-analogs of Formula II which when treated with DDQ in aqueous actone (preferably 95% acetone) utilizing techniques known in the art convert rapidly in good yields to the 6-oximinomethyl-4,6-pregnadiene-3,20-diones of Formula II. Thus, for example, 3-ethoxy-6-oximinomethyl-16-methylene-17α-acetoxy-3,5-pregnadien-20-one treated with DDQ in 95% aqueous acetone at 20° C. for 45 minutes is converted to 6-oximinomethyl-16-methylene-17α-acetoxy-4,6-pregnadiene-3,20-dione which is isolated in excellent yields utilizing chromatographic and crystallization techniques.

It is surprising that the above described process produces 6 - oximinomethyl-4,6-pregnadiene-3,20-dione since we have found that the corresponding 6-cyano-enol ethers, i.e. a 3 - alkoxy-6-cyano-3,5-pregnadiene-3,20-dione, are completely inert to DDQ and even under forcing conditions (large excess of DDQ in refluxing dioxane for 48 hours) fail to produce the oxidized product, i.e., a 6-cyano-4,6 - pregnadiene-3,20-dione. Indeed, we have also found that the foregoing reaction does not proceed with the use of other known dehydrogenating agents such as chloranil.

Those compounds of Formula II wherein R is lower alkanoyl are derived from the corresponding 6-oximinomethyl derivatives utilizing standard esterification techniques under basic conditions such as that utilizing an acid anhydride in pyridine. Thus, treatment of the aforedescribed 6 - oximinomethyl-16-methylene-17α-acetoxy-4,6 - pregnadiene-3,20-dione (a compound of Formula II wherein R is hydrogen) with acetic anhydride in pyridine at 20° C. yields 6-acetoximinomethyl-16-methylene-17α-acetoxy - 4,6-pregnadiene-3,20-dione (compound of Formula II wherein R is acetyl).

The 6-oximinomethylprogesterone enol-ether necessary precursors (i.e., 3 - ethoxy-6-oximinomethyl-3,5-pregnadien - 20 - ones of the 6-oximinomethyl-6-dehydroprogesterones of Formula II are conveniently prepared from the corresponding 6-formyl derivative according to known procedures by reaction with hydroxylamine hydrochloride in sodium acetate. In turn, the 6-formyl enol ethers (e.g., 3 - ethoxy-6-formyl-16-methylene-17α-acetoxy-3,5-pregnadien-20-one) are derived from the corresponding 6-unsubstituted compounds (e.g., 3-ethoxy-16-methylene-17α-acetoxy - 3,5-pregnadien-20-one) by reaction with phosphorus oxychloride in dimethylformamide followed by treatment with sodium acetate.

Process aspect of the invention

The process aspect of this invention provides a method for preparing the pharmacologically active 6-cyano-4,6-pregnadiene-3,20-diones of Formula I and resides in the concept of treating a corresponding 6-oximinomethyl-4,6-pregnadiene-3,20-dione of Formula II with a dehydrating agent selected from the group consisting of phosphorus oxychloride, a lower alkanoic acid anhydride in pyridine, and a lower alkanoic acid anhydride in the presence of sodium acetate.

When phosphorus oxychloride is used as the dehydrating agent, the process of this invention is usually carried out by suspending or dissolving a 6-oximinomethyl-4,6-pregnadiene-3,20-dione (e.g., 6-oximinomethyl-16-methylene-17α-acetoxy-4,6-pregnadiene-3,20-dione) in a tertiary amine (preferably pyridine), adding an excess (usually a large excess) of phosphorous oxychloride per mole of 6-oximinopregnadiene, and stirring the reaction mixture, preferably under an inert atmosphere (e.g., nitrogen) at temperatures in the range of from about 0° C. to about 40° C. (preferably at ambient temperatures) for about two hours, or until a thin layer chromatogram of an aliquot of the reaction mixture indicates an absence of 6-oximinomethyl pregnadiene starting compound. The resulting 6-cyano-4,6-pregnadiene-3,20-dione (e.g., 6-cyano-16 - methylene - 17α-acetoxy-4,6-pregnadiene-3,20-dione) is then easily isolated by addition of water, collection of the precipitate by filtration or extraction, and purification using known methods such as crystallization or via chromatographic techniques.

When a lower alkanoic acid anhydride either in pyridine or in the presence of sodium acetate is used as a dehydrating agent, the 6-oximinomethyl-4,6-pregnadiene-3,20-dione (e.g., 6-oximinomethyl-16-methyl-17α-acetoxy-4,6-pregnadiene-3,20-dione) together with a large molar excess of a lower alkanoic acid anhydride (usually acetic anhydride) either in pyridine or in the presence of a catalytic quantity of sodium acetate is usually heated at reflux temperature for about two to three hours. Isolation of the resulting 6-cyano-4,6-pregnadiene-3,20-dione (e.g., 6 - cyano - 16-methylene-17α-acetoxy-4,6-pregnadiene-3,20-dione) is effected in similar manner as when phosphorus oxychloride is used as dehydrating agent.

When a lower alkanoic acid anhydride either in pyridine agent employed in our process, it is preferable to use the anhydride of the same acid from whence is derived the lower alkanoate ester at C–17.

When utilizing a lower alkanoic anhydride in pyridine dehydrating agent (e.g., acetic anhydride in pyridine) the 6-oximinomethyl - 4,6 - pregnadiene-3,20-dione (e.g., 6-oximinomethyl - 16 - methylene-17α-acetoxy-4,6-pregnadiene-3,20-dione) is first converted to a 6-acyloximinomethyl - 4,6 - pregnadiene - 3,20-dione intermediate (e.g., 6 - acetoximino - 16 - methylene-17α-acetoxy-4,6-pregnadiene - 3,20-dione) which can be isolated and purified according to known procedures prior to conversion to the 6 - cyano-4,6-pregnadiene-3,20-dione. In such cases, the esterification stage of the process is preferably carried out at ambient temperatures. Thus, for example, when 6-oximinomethyl - 16 - methylene-17α-acetoxy-4,6-pregnadiene-3,20-dione upon treatment with an excess of acetic anhydride in pyridine at about 20° C. for three days (or until the absence of the 6-oximinomethyl group is indicated by thin layer chromatography), there is formed 6-acetoximino - 16 - methylene-17α-acetoxy-4,6-pregnadiene-3,20-dione which, after isolation and purification, can then be further treated with a molar quantity of acetic anhydride in pyridine at reflux temperature for about two hours to yield the progestationally active 6-cyano derivative, 6-cyano - 16 - methylene-17α-acetoxy-4,6-pregnadiene-3,20-dione.

Phosphorus oxychloride is the preferred dehydrating agent for carrying out our process. With phosphorus oxychloride, the dehydration reaction proceeds faster and at lower temperatures and produces greater yields of purer 6-cyano-4,6-pregnadiene-3,20-dione product than when utilizing a lower alkanoic acid anhydride dehydrating agent.

Our invention is further described in the examples which follow. These examples are set forth by way of illustration only. It will be understood the invention is not to be construed as limited in scope by the details set forth therein, since modifications and equivalents both in materials and methods will be apparent from the disclosure to those skilled in the art.

EXAMPLE 1

6-oximinomethyl-16-methylene-17α-acetoxy-4,6-pregnadiene-3,20-dione (A) 3 - ethoxy-6-formyl-16-methylene-17α-acetoxy-3,5-pregnadien-20-one.—To a suspension of 16.3 g. of 3-ethoxy-16-methylene-17α-acetoxy-3,5-pregnadien - 20-one in 163 ml. of dimethylformamide, add dropwise at 20° C. a solution of 9.7 ml. of phosphorus oxychloride in 81.5 ml. of dimethylformamide. Stir the reaction mixture at 20° C. for 2.5 hours, then add 4 liters of water containing 100 g. of potassium acetate. Stir the aqueous mixture for one hour, then collect by filtration the resulting precipitate comprising 3-ethoxy-6-formyl-16-methylene-17α-acetoxy-3,5-pregnadien-20-one. Purify by crystallization from ethanol. Yield, 13 g.; M.P. 170–174° C.; $[\alpha]_D^{25°}$—255° (chloroform);

$$\lambda_{max.}^{methanol}\ 219\ m\mu\ (\epsilon\ 11,300)\ 325\ (\epsilon\ 15,300)$$

(B) 3 - ethoxy-6-oximinomethyl-16-methylene-17α-acetoxy-3,5-pregnadiene-20-one.—Add 186 mg. sodium acetate to a solution of 500 mg. of 3-ethoxy-6-formyl-16-methylene-17α-acetoxy-3,5-pregnadien-20-one and 88 mg. of hydroxylamine hydrochloride in 10 ml. ethanol and 2 ml. of water. Heat the reaction mixture at reflux temperature for 30 minutes, then pour into water. Collect by filtration and air dry the resultant precipitate comprising 3-ethoxy-6-oximinomethyl-16-methylene-17α-acetoxy-3,5-pregnadien-20-one. Purify by chromatographing over deactivated silica gel (15% water, 57 x 2 cm.) eluting with benzene-ether (9:1). Evaporate the benzene-ether eluates and recrystallize the resultant residue from ethanol-water to yield 324 mg. (63%) of 3-ethoxy-6-oximinomethyl-16-methylene-17α-acetoxy-3,5 - pregnadien-20-one as a hemihydrate; M.P., 135–140° C.; $[\alpha]_D^{25°}$—151° (chloroform);

$$\lambda_{max.}^{methanol}\ 296\ m\mu\ (\epsilon\ 21,000)$$

(C) 6 - oximinomethyl-16-methylene-17α-acetoxy-4,6-pregnadiene-3,20-dione.—To a solution of 3.48 g. of 3-ethoxy-6-oximinomethyl - 16 - methylene-17α-acetoxy-3,5-pregnadiene-3,20-dione in 80 ml. of 95% aqueous acetone, add 3 g. of dichlorodicyanobenzoquinone (DDQ) and stir the reaction mixture at 20° C. for 45 minutes. Pour the reaction mixture onto a column of neutral alumina (Woelm, activity grade I) and elute with chloroform in ethanol (1:1). Evaporate the combined eluates and rechromatograph the resultant residue over neutral alumina (Woelm, activity grade I). Elute with chloroform. Evaporate the chloroform eluate to a residue comprising 6 - oximinomethyl-16-methylene-17α-acetoxy-4,6-pregnadiene-3,20-dione. (Yield, 2.21 g.) Purify by crystallization from ethyl acetate to give the ethyl acetate solvate of 6-oximinomethyl-16-methylene-17α-acetoxy-4,6-pregnadiene-3,20-dione; M.P., 140–145° C.; $[\alpha]_D^{25°}$—103° (dioxane);

$$\lambda_{max.}^{methanol}\ 244\text{–}246\ m\mu\ (\epsilon\ 11,620),\ 287\ m\mu\ (\epsilon\ 16,000)$$

EXAMPLE 2

6 - cyano-16-methylene-17α-acetoxy-4,6-pregnadiene-3,20-dione 6-cyano-16-methylene-17α-acetoxy-6-dehydroprogesterone)

(A) To a solution of 488 mg. of 6-oxyminomethyl-16-methylene-17α-acetoxy-4,6-pregnadiene-3,20-dione in 5 ml. of pyridine, add 2.2 ml. of phosphorus oxychloride and stir the reaction mixture for two hours at room temperature under an atmosphere of nitrogen. Pour the reaction mixture into water, collect by filtration the resultant precipitate comprising 6-cyano-16-methylene-17α-acetoxy-4,6-pregnadiene-3,20-dione. Air dry the foregoing precipitate and purify by crystallization from ethyl acetate to give 329 mg. (70%) of 6-cyano-16-methylene-17α-acetoxy-4,6-pregnadiene-3,20-dione; M.P., 221–223° C.; $[\alpha]_D^{25°}$—141°;

$\lambda_{max.}^{methanol}$ 275 m$\mu$ ($\epsilon$ 23,800)

Alternatively, the compound of this example is prepared according to following procedures B and C.

(B) 6 - Acetoximinomethyl-16-methylene-17α-acetoxy-4,6-pregnadiene-3,20-dione.—To a solution of 1.1 g. of 6 - oximinomethyl-16-methylene-17α-acetoxy-4,6-pregnadiene-3,20-dione in 10 ml. pyridine, add 5 ml. acetic anhydride and allow the reaction mixture to stand at 20° C. for three days. Add the reaction mixture to water, then collect by filtration and air dry the resultant precipitate comprising 6-acetoximinomethyl-16-methylene-17α-acetoxy-4,6-pregnadiene-3,20-dione; yield, 1.106 g.; M.P., 120–126° C.;

$\lambda_{max.}^{methanol}$ 242–244 m$\mu$ ($\epsilon$ 10,900, inflexion), 280 m$\mu$ ($\epsilon$ 19,200)

(C) 6-cyano-16-methylene-17α-acetoxy - 4,6 - pregnadiene-3,20-dione (6 - cyano-16-methylene-17α-acetoxy-6-dehydroprogesterone).—To 1 g. of 6-acetoximinomethyl-16-methylene-17α-acetoxy-4,6-pregnadiene-3,20-dione in 20 ml. of pyridine, add 4 ml. of acetic anhydride and heat the reaction mixture at reflux temperature for two hours. Add the reaction mixture to water and collect by filtration and air dry the resultant precipitate. Chromatograph the precipitate on neutral alumina (Woelm, activity grade I, 50 x 2 cm.) eluting with benzene-chloroform (1:1). Evaporate the combined eluates to a residue comprising 6-cyano-16-methylene-17α-acetoxy-4,6-pregnadiene-3,20-dione.

EXAMPLE 3

6-cyano-17α-acetoxy-4,6-pregnadiene-3,20-dione (A) 6-oximinomethyl-17α-acetoxy - 4,6 - pregnadiene-3,20-dione.—In a manner similar to that described in Example 1C, treat 3-methoxy-6-oximinomethyl-17α-acetoxy-3,5-pregnadien-20-one in 95% aqueous acetone with dichlorodicyanobenzoquinone at 20° C. for 45 minutes. Isolate and purify the resultant product in a manner similar to that described in Example 1C to obtain 6-oximinomethyl-17α-acetoxy-4,6-pregnadiene-3,20-dione.

(B) 6-cyano-17α-acetoxy-4,6-pregnadiene-3,20-dione.—In a manner similar to that described in Example 2A, treat 6-oximinomethyl-17α-acetoxy-4,6-pregnadiene-3,20-dione with phosphorus oxychloride in pyridine at 20° C. under an atmosphere of nitrogen. Isolate and purify the resultant product in a manner similar to that described in Example 2A to obtain 6-oximinomethyl-17α-acetoxy-4,6-pregnadiene-3,20-dione.

EXAMPLE 4

6-cyano-4,6-pregnadiene-3,20-dione (A) 3 - ethoxy - 6 - formyl - 3,5 - pregnadien - 20-one.—In a manner similar to that described in Example 1A, treat 3-ethoxy-3,5-pregnadien-20-one with a solution of phosphorus oxychloride in dimethylformamide followed by treatment of the reaction mixture with aqueous potassium acetate. Isolate and purify the resultant product in a manner similar to that described in Example 1A to obtain 3-ethoxy-6-formyl-3,5-pregnadien-20-one.

(B) 3-ethoxy - 6 - oximinomethyl-3,5-pregnadien-20-one.—In a manner similar to that described in Example 1B, treat 3-ethoxy-6-formyl-3,5-pregnadien-20-one with hydroxylamine hydrochloride in aqueous ethanol together with sodium acetate. Isolate and purify the resultant product in a manner similar to that described in Example 1B to obtain 3-ethoxy-6-oximinomethyl-3,5-pregnadien-20-one.

(C) 6 - oximinomethyl - 4,6 - pregnadiene - 3,20-dione.—In a manner similar to that described in Example 1C, treat 3 - ethoxy - 6 - oximinomethyl - 3,5 - pregnadien-20-one with dichlorodicyanobenzoquinone in aqueous acetone at 20° C. Isolate and purify the resultant product in a manner similar to that described in Example 1C to obtain 6-oximinomethyl-4,6-pregnadiene-3,20-dione.

(D) 6-cyano-4,6-pregnadiene-3,20-dione.—In a manner similar to that described in Example 2A, treat 6-oximinomethyl-4,6-pregnadiene-3,20-dione with phosphorus oxychloride in pyridine under an atmosphere of nitrogen at 20° C. Isolate and purify the resultant product in a manner similar to that described in Example 2A to obtain 6-cyano-4,6-pregnadiene-3,20-dione.

Alternatively, the compound of this example is prepared from 6-oximinomethyl-4,6-pregnadiene-3,20-dione according to following procedures E and F.

(E) 6 - acetoximinomethyl - 4,6 - pregnadiene - 3,20-dione.—In a manner similar to that described in Example 2B, treat 6 - oximinomethyl - 4,6 - pregnadiene - 3,20-dione with acetic anhydride in pyridine at 20° C. Isolate and purify the resultant product in a manner similar to that described in Example 2B to obtain 6-acetoximinomethyl-4,6-pregnadiene-3,20-dione.

(F) 6-cyano-4,6-pregnadiene-3,20-dione.—In a manner similar to that described in Example 2C, treat 6-acetoximinomethyl - 4,6 - pregnadiene - 3,20 - dione with acetic anhydride in pyridine at reflux temperature for two hours. Isolate and purify the resultant product in a manner similar to that described in Example 2C to obtain 6-cyano-4,6-pregnadiene-3,20-dione.

EXAMPLE 5

Other 6-cyano-4,6-pregnadiene-3,20-diones (A) 3 - ethoxy - 6 - formyl - 3,5 - pregnadien - 20-ones.—The requisite enol-ether starting compounds are prepared by treating each of the following progesterones with ethyl orthoformate with ethanol in the presence of p-toluene-sulphonic acid according to known procedures:

16α-methyl-4-pregnene-3,20-dione,
16β-methyl-4-pregnene-3,20-dione,
16α-methyl-17α-acetoxy-4-pregnene-3,20-dione,
16β-methyl-17α-acetoxy-4-pregnene-3,20-dione,
16-methylene-17α-propionyloxy-4-pregnene-3,20-dione, and
16-methylene-17α-caproyloxy-4-pregnene-3,20-dione.

The following enol-ethyl ethers are thereby formed utilizing known techniques:

3-ethoxy-16α-methyl-3,5-pregnadien-20-one,
3-ethoxy-16β-methyl-3,5-pregnadien-20-one,
3-ethoxy-16α-methyl17α-acetoxy-3,5-pregnadien-20-one,
3-ethoxy-16β-methyl-17α-acetoxy-3,5-pregnadien-20-one,
3-ethoxy-16-methylene-17α-propionyloxy-3,5-pregnadien-20-one, and
3-ethoxy-16-methylene-17α-caproyloxy-3,5-pregnadien-20-one.

In a manner similar to that described in Example 1A, treat each of the above 3-ethoxy-3,5-pregnadien-20-ones with a solution of phosphorus oxychloride in dimethylformamide followed by treating the reaction mixture with aqueous potassium acetate. Isolate and purify the resultant products in a manner similar to that described in Example 1A to obtain the following respective 6-formyl derivatives:

3-ethoxy-6-formyl-16α-methyl-3,5-pregnadien-20-one,
3-ethoxy-6-formyl-16β-methyl-3,5-pregnadien-20-one,
3-ethoxy-6-formyl-16α-methyl-17α-acetoxy-3,5-pregnadien-20-one,
3-ethoxy-6-formyl-16β-methyl-17α-acetoxy-3,5-pregnadien-20-one,
3-ethoxy-6-formyl-16-methylene-17α-propionyloxy-3,5-pregnadien-20-one, and
3-ethoxy-6-formyl-16-methylene-17α-caproyloxy-3,5-pregnadien-20-one.

(B) 3-ethoxy - 6 - oximinomethyl-3,5-pregnadien-20-ones.—In a manner similar to that described in Example 1B, treat each of the 3-ethoxy-6-formyl derivatives prepared as described in Example 5A hereinabove with hydroxylamine hydrochloride in aqueous ethanol together with sodium acetate. Isolate and purify the resultant respective products in a manner similar to that described in Example 1B to obtain the following respective 3-ethoxy-6-oximinomethyl derivatives:

3-ethoxy-6-oximinomethyl-16α-methyl-3,5-pregnadien-20-one,
3-ethoxy-6-oximinomethyl-16β-methyl-3,5-pregnadien-20-one,
3-ethoxy-6-oximinomethyl-16α-methyl-17α-acetoxy-3,5-pregnadien-20-one,
3-ethoxy-6-oximinomethyl-16β-methyl-17α-acetoxy-3,5-pregnadien-20-one,
3-ethoxy-6-oximinomethyl-16-methylene-17α-propionyloxy-3,5-pregnadien-20-one, and
3-ethoxy-6-oximinomethyl-16-methylene-17α-caproyloxy-3,5-pregnadien-20-one.

(C) 6-oximinomethyl-4,6-pregnadiene-3,20-diones.—In a manner similar to that described in Example 1C, treat each of the 3-ethoxy-6-oximinomethyl derivatives prepared in above Example 5B with 2,3-dichloro-5,6-dicyano-1,4-benzoquinone in aqueous acetone at 20° C. Isolate and purify the resultant respective products in a manner similar to that described in Example 1C to obtain the following 6-oximinomethyl-4,6-pregnadiene-3,20-diones:

6-oximinomethyl-16α-methyl-4,6-pregnadiene-3,20-dione,
6-oximinomethyl-16β-methyl-4,6-pregnadiene-3,20-dione,
6-oximinomethyl-16α-methyl-17α-acetoxy-4,6-pregnadiene-3,20-dione,
6-oximinomethyl-16β-methyl-17α-acetoxy-4,6-pregnadiene-3,20-dione,
6-oximinomethyl-16-methylene-17α-propionyloxy-4,6-pregnadiene-3,20-dione, and
6-oximinomethyl-16-methylene-17α-caproyloxy-4,6-pregnadiene-3,20-dione.

(D) 6-cyano-4,6-pregnadiene-3,20-diones.—In a manner similar to that described in Example 2A, treat each of the 6-oximinomethyl-4,6-pregnadienes prepared in above Example 5C with phosphorus oxychloride in pyridine in an atmosphere of nitrogen at a temperature of about 20° C. Isolate and purify the resultant respective products in a manner similar to that described in Example 2A to obtain the following respective products to obtain 6-cyano-4,6-pregnadiene-3,20-diones:

6-cyano-16α-methyl-4,6-pregnadiene-3,20-dione,
6-cyano-16β-methyl-4,6-pregnadiene-3,20-dione,
6-cyano-16α-methyl-17α-acetoxy-4,6-pregnadiene-3,20-dione,
6-cyano-16β-methyl-17α-acetoxy-4,6-pregnadiene-3,20-dione,
6-cyano-16-methylene-17α-propionyloxy-4,6-pregnadiene-3,20-dione, and
6-cyano-16-methylene-17α-caproyloxy-4,6-pregnadiene-3,20-dione.

EXAMPLE 6

Alternate preparation of 6-cyano-16-methylene-17α-acetoxy-4,6-pregnadiene-3,20-dione Add 1 g. of 6-oximinomethyl-16-methylene-17α-acetoxy-4,6-pregnadiene-3,20-dione to 25 ml. of acetic anhydride and 100 mgm. of sodium acetate. Heat the reaction mixture at reflux temperature for three hours; then cool, pour into a large volume of water and stir the reaction mixture for about an hour. Filter and air dry the resultant precipitate via chromatographic techniques in a manner similar to that described in Example 2C to obtain 6-cyano-16-methylene-17α-acetoxy - 4,6 - pregnadiene-3,20-dione.

We claim:
1. A compound having the following structural formula:

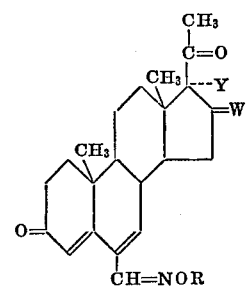

wherein R is a member selected from the group consisting of hydrogen and lower alkanoyl; W is a member selected from the group consisting of hydrogen, methylene, (H,α-methyl) and (H,β-methyl); and Y is a member selected from the group consisting of lower alkanoyloxy, and hydrogen when W is hydrogen or (H,methyl).

2. A compound according to claim 1 wherein R is hydrogen and Y is lower alkanoyloxy.

3. A compound according to claim 1 wherein R is hydrogen, Y is lower alkanoyloxy and W is methylene, said compound being 6-oximinomethyl-16-methylene-17α-lower alkanoyloxy-4,6-pregnadiene-3,20-dione.

4. A compound according to claim 1 wherein R is hydrogen, Y is acetoxy, and W is methylene, said compound being 6-oximinomethyl-16-methylene-17α-acetoxy-4,6-pregnadiene-3,20-dione.

5. A compound according to claim 1 wherein R and Y are acetoxy and W is methylene, said compound being 6-acetoximinomethyl-16-methylene - 17α - acetoxy-4,6-pregnadiene-3,20-dione.

6. A process for the preparation of a compound having the following structural Formula I:

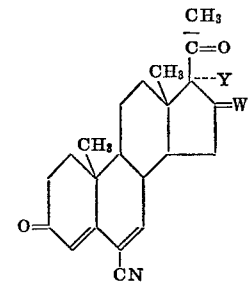

(I)

wherein W is a member selected from the group consisting of hydrogen, methylene, (H,α-methyl), and (H,β-methyl); and Y is a member selected from the group consisting of lower alkanoyloxy, and hydrogen when W is hydrogen or (H,methyl); which comprises treating a 6-oximinomethyl steroid of following structural Formula II:

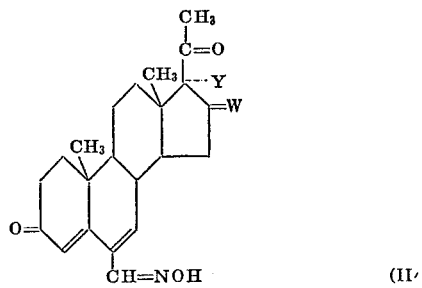

wherein Y and W are as hereinabove defined; with a dehydrating agent selected from the group consisting of phosphorus oxychloride, a lower alkanoic acid anhydride in pyridine, and a lower alkanoic acid anhydride in the presence of sodium acetate.

7. The process of claim 6 when carried out on a 6-oximino steroid of Formula II wherein Y is lower alkanoyloxy, and W is methylene and wherein said dehydrating agent is phosphorus oxychloride, said process comprising treating 6-oximinomethyl-16-methylene-17α-lower alkanoyloxy-4,6-pregnadiene-3,20-dione with phosphorus oxychloride, whereby is formed 6-cyano-16-methylene-17α-lower alkanoyloxy-4,6-pregnadiene-3,20-dione.

8. Process of claim 7 wherein Y is acetoxy, said process comprising treating 6-oximinomethyl-16-methylene-17α-acetoxy-4,6-pregnadiene-3,20-dione with phosphorus oxychloride whereby is formed 6-cyano-16-methylene-17α-actoxy-4,6-pregnadiene-3,20-dione.

References Cited
UNITED STATES PATENTS

| | | | |
|---|---|---|---|
| 3,019,240 | 1/1962 | Bowers et al. | 260—397.3 |
| 3,046,285 | 7/1962 | Bowers et al. | 260—397.45 |
| 3,311,617 | 3/1967 | Petrow et al. | 260—239.55 |
| 3,527,778 | 9/1970 | Baran et al. | 260—397.45 |

HENRY A. FRENCH, Primary Examiner

U.S. Cl. X.R.

260—397.3, 999